3,179,702
REACTION OF CARBON DIOXIDE
WITH FLUORINE
Roger S. Porter, Orinda, Calif., and George H. Cady, Seattle, Wash., assignors, by mesne assignments, to the United States of America as represented by the Secretary of the Navy
No Drawing. Filed Nov. 29, 1962, Ser. No. 241,087
1 Claim. (Cl. 260—619)

This application is a continuation-in-part of our copending application Serial Number 838,389, filed September 8, 1959, now U.S. Patent No. 3,100,803, issued August 13, 1963.

This invention relates to the preparation and production, by the reaction of carbon dioxide with fluorine, of perfluorodimethyl peroxide, a compound of the empirical formula, $C_2F_6O_2$. The structural formula probably is

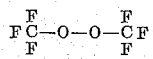

The object of the invention is to provide a good method for producing the compound.

It has heretofore been known that perfluorodimethyl peroxide is produced in small yield by the electrolysis of an aqueous solution containing trifluoroacetate ion [F. Swarts, Bull. soc. chim. Belg. 42, 102 (1933)] but only very small amounts have been obtained. The method is costly because of the low efficiency in utilization of materials. The present invention uses materials efficiently and is capable of producing large amounts of perfluorodimethyl peroxide at a much lower cost than was formerly possible.

Perfluorodimethyl peroxide is an oxidizing agent capable of supporting the combustion of hydrocarbons and other fuels. It is of potential value as an oxidant for fuels in rocket propulsion. Since it is a peroxide, it may be expected to be of value for causing polymerization reactions to occur.

The inventors now disclose that perfluorodimethyl peroxide is formed by combining carbonyl fluoride with trifluoromethyl hypofluorite. The reaction may be represented by the equation:

$$CF_3OF + COF_2 \rightarrow CF_3OOCF_3 \qquad (1)$$

They also disclose that the peroxide may be prepared by combining fluorine with carbon monoxide or with carbonyl fluoride. Fluorinating catalysts such as the higher fluorides of metals belonging to the class including $AgF_2$, $CuF_2$, $CoF_3$, $CeF_4$, $HgF_2$, $SbF_5$, $FeF_3$ and $NiF_2$ induce the reaction. In the case of carbonyl fluoride, it is probable that fluorine reacts to give trifluoromethyl hypofluorite as shown in Equation 2

$$COF_2 + F_2 \rightarrow CF_3OF \qquad (2)$$

and that the hypofluorite combines with unchanged carbonyl fluoride as shown in Equation 1. When carbon monoxide is used as the starting material, it first reacts with fluorine to give carbonyl fluoride as shown in Equation 3

$$CO + F_2 \rightarrow COF_2 \qquad (3)$$

The carbonyl fluoride may then give perfluorodimethyl peroxide by reactions (2) and (1). These equations and the theoretical discussion are given at this point to make clear the nature of the invention and to show that the different methods may be regarded as one invention.

The theory permits one to predict that many substances may react with fluorine to give perfluorodimethyl peroxide. Thus, one would expect any substance capable of reacting with fluorine to give carbonyl fluoride to also be capable of giving perfluorodimethyl peroxide. It should be possible to prepare perfluorodimethyl peroxide by the reaction of fluorine with such substances as methanol, ethanol, dimethyl ether, formaldehyde and many other compounds containing carbon and oxygen atoms. Many combinations of reactants should give both carbonyl fluoride and trifluoromethyl hypofluorite. When both of these products are present in a reacting mixture, one may expect to obtain perfluorodimethyl peroxide. Perfluorodimethyl peroxide can be produced by reacting carbon monoxide, carbon dioxide or carbonyl fluoride with either fluorine or trifluoromethyl hypofluorite.

In order that a high yield of perfluorodimethyl peroxide may be obtained by the reaction of fluorine with carbonyl fluoride or carbon monoxide, or by the reaction of carbonyl fluoride with trifluoromethyl hypofluorite, it is necessary that the temperature and the relative proportions of the reactants be held within certain limits. The yield also is dependent upon the length of time allowed for the reaction and upon the presence or absence of a catalyst.

Four different reaction vessels have been used by the inventors to prepare perfluorodimethyl peroxide. Vessel A was a cylindrical container made of nickel. It had a volume of 1.71 liters and it could be heated to any desired temperature by electrical heaters. Its temperature was measured by thermocouples. The reactants were added separately to this vessel and their pressures were measured. As the vessel was heated, the course of a reaction involving a pressure change was followed by measuring the total pressure of the mixture of gases. Samples of gas were sometimes removed from the vessel for identification and analysis.

*Example*

A two to one ratio by volume of fluorine and carbon dioxide was heated in vessel A to about 325° C. and was then cooled slowly to room temperature. The resulting mixture of gas contained about ten percent perfluorodimethyl peroxide.

*Summary*

(1) Perfluorodimethyl peroxide may be obtained in the following ways: (a) combining carbonyl fluoride with trifluoromethyl hypofluorite, (b) combining carbon monoxide with fluorine, (c) combining carbonyl fluoride with fluorine, (d) reacting carbon dioxide with fluorine. Any combination of reactants which forms both carbonyl fluoride and trifluoromethyl hypofluorite should also be capable of forming perfluorodimethyl peroxide.

(2) The preferred proportions of reactants are in each case those required by the stoichiometry of the reactions. A range of concentrations may be used in each case. For carbon monoxide and fluorine it is best that the ratio by volume lie within the limits 1 to 1 up to 1 of CO to 2 of $F_2$. For fluorine and carbonyl fluoride it is desirable that the ratio of $F_2$ to $COF_2$ be less than 1.

(3) In the absence of a catalyst the reaction vessel should preferably be held at a temperature greater than 200° C. The reaction occurs at temperatures as low as 25° C. but it is slow. Even though perfluorodimethyl peroxide decomposes at temperatures below 325° C., it is possible to produce the substance with the reactor (at least in part) at higher temperatures than this. Apparently the upper temperature limit is that at which the rate of corrosion of the reactor by fluorine becomes large. For a nickel vessel this temperature is about 500° C.

(4) Copper, coated with silver fluoride(s) serves as a catalyst for the preparation of perfluorodimethyl peroxide. When it is present, reaction temperatures as slow as 25° C. may be used. The catalyst can be used over the entire temperature range suitable for the preparation of perfluorodimethyl peroxide. The preferred portion of this temperature range wherein the yield of the product is of desirable magnitude is from about 80° C. to about 325° C. and it is in that segment of this preferred portion of the temperature range lying between about 80° C. and about 225° C. that the catalyst is very helpful, because below 225° C. the reaction of $CF_3OF$ with $COF_2$ is otherwise undesirably slow. Although the catalyst can be used in the higher segment, from about 225° C. to about 325° C., of the preferred portion of the temperature range, the reaction proceeds in that segment of the temperature range at a practically desirable rate in the absence of a catalyst, as suggested in (3) immediately above.

Obviously many modifications and variations of the present invention are possible in the light of the above teachings. It is therefore to be understood that within the scope of the appended claim the invention may be practiced otherwise than as specifically described.

What is claimed is:

A process for producing perfluorodimethyl peroxide which comprises contacting carbon dioxide with fluorine at a temperature of about 325° C. and wherein the total volume of fluorine used in the process is about twice as great as the volume of carbon dioxide.

References Cited by the Examiner

UNITED STATES PATENTS 3,100,803  8/63  Porter _____ 260—610

OTHER REFERENCES

Porter et al.: Jour. Amer. Chem. Soc., 79:5628–31 (1957) (4 pages).

LEON ZITVER, *Primary Examiner.*

HAROLD G. MOORE, *Examiner.*